United States Patent
Blauvelt (10) Patent No.: US 6,549,316 B2
(45) Date of Patent: Apr. 15, 2003

(54) CIRCUIT FOR SUPPRESSING NOISE AND DISTORTION IN LINEAR FIBER OPTIC LINKS

(75) Inventor: Henry A. Blauvelt, San Marino, CA (US)

(73) Assignees: Agere Systems, Inc., Allentown, PA (US); Emcure Corporation, Somerst, NJ (US)

( * ) Notice: Subject to any disclaimer, the term of this patent is extended or adjusted under 35 U.S.C. 154(b) by 0 days.

(21) Appl. No.: 09/464,054

(22) Filed: Dec. 15, 1999

(65) Prior Publication Data
US 2002/0063930 A1 May 30, 2002

Related U.S. Application Data
(60) Provisional application No. 60/112,421, filed on Dec. 15, 1998.

(51) Int. Cl.[7] .................. H04B 10/00; H04B 10/04; H04J 14/02; H01S 3/13; H01S 3/00
(52) U.S. Cl. .................. 359/161; 359/180; 359/187; 359/132; 372/31; 372/33; 372/38.1
(58) Field of Search .................. 359/181, 187, 359/132, 125, 161; 372/33, 31, 22, 25, 38.01

(56) References Cited
U.S. PATENT DOCUMENTS

| | | | | |
|---|---|---|---|---|
| 4,504,976 A | * | 3/1985 | Beaudet | 455/611 |
| 5,402,433 A | * | 3/1995 | Stiscia | 372/31 |
| 5,453,868 A | * | 9/1995 | Blauvelt et al. | 359/173 |
| 5,481,389 A | * | 1/1996 | Pidgeon et al. | 359/161 |
| 5,519,530 A | * | 5/1996 | Utsumi | 359/264 |
| 5,680,238 A | * | 10/1997 | Masuda | 359/132 |
| 5,689,356 A | * | 11/1997 | Rainal | 359/181 |
| 5,809,049 A | * | 9/1998 | Schaefer et al. | 372/38 |
| 5,828,477 A | * | 10/1998 | Nilsson et al. | 359/181 |
| 5,900,959 A | * | 5/1999 | Noda et al. | 359/180 |
| 5,963,570 A | * | 10/1999 | Gnauck et al. | 372/38 |
| 6,211,984 B1 | * | 4/2001 | Yoshida | 359/161 |

* cited by examiner

Primary Examiner—Leslie Pascal
Assistant Examiner—M. R. Sedighian
(74) Attorney, Agent, or Firm—Christie, Parker & Hale, LLP (57) ABSTRACT

The quality of a multi-channel signal launched into an optical fiber may be degraded by active device distortion as well as non-linear fiber effects. Active device distortion in the form of clipping distortion and interferometric noise are reduced by a laser bias control circuit that does not require significant delay of the main RF signal. An information carrying signal, with periodic high amplitude peaks, drives the RF input of a laser as well as the input of a laser bias control circuit. The laser bias control circuit directly modulates the laser with a low frequency signal that is proportional to the frequency of occurrence and intensity of peaks in the information carrying signal that are likely to cause the laser to clip.

46 Claims, 6 Drawing Sheets

CIRCUIT FOR SUPPRESSING NOISE AND DISTORTION IN LINEAR FIBER OPTIC LINKS

CROSS-REFERENCE TO RELATED APPLICATION

This application claims the benefit of U.S. provisional patent application No. 60/112,421, filed Dec. 15, 1998, the contents of which are hereby incorporated by reference.

FIELD OF THE INVENTION

This application relates generally to a method and apparatus for suppressing distortion and noise in fiber optic transmission systems, and more particularly to a method and apparatus for suppressing clipping distortion and interferometric noise.

BACKGROUND

Noise in modern communication networks has been greatly reduced by improvements in the inherent noise and linearity of distributed feedback (DFB) laser transmitters. In addition, the introduction of predistortion circuitry that reduces residual non-linearities in the laser output has further improved the performance of linear fiber optic links. The demand for greater data handling capability, however, requires the linear transmission of multiple channels of information. When multi-channel signals are launched into an optical fiber, active device distortion as well as non-linear fiber effects can degrade the quality of the signal. Often, device distortion is the result of the laser output being clipped when transmitting large negative amplitude signals that occasionally occur in multichannel signals.

For example, typical state of the art optical transmitters operate with 110 channels and a modulation depth of approximately 3.5% per channel. If each of the 110 channels were to align in phase, the transmitted signal would have a peak amplitude that was 385% of the laser bias. The probability of all channels aligning in phase is negligible, so that such severe overdrive conditions are not encountered and typically need not be designed for. However, smaller, negative amplitude signal peaks do regularly occur during the transmission of multi-channel signals. Such negative amplitude signals drive the laser output power to zero. This results in distortion due to clipping of the transmitted signal.

Conventional techniques to reduce clipping distortion utilize peak detection circuits to identify amplitude spikes in the transmit signal that may result in clipping. Typically, when such a peak is detected, the laser bias is temporarily increased until the clipping event has passed. However, the laser bias must be adjusted slowly to prevent the bias control circuit from producing signals at frequencies within the transmission band. This, in turn, requires a long RF delay between the peak detector circuit and the laser transmitter. In practice, this delay is difficult to implement because of the physical size of the coaxial delay line and the RF loss of the delay line.

Another limit on the quality of the transmitted signal is interferometric noise created by double back-scattering of the optical signal within an optical fiber. Double back-scattering typically creates noise over a wide frequency spectrum, ranging from DC to the spectral width of the transmitted optical signal. Therefore, it is desirable to maximize the width of the optical spectrum so as to minimize the interferometric noise. Conventionally, the optical spectrum is increased by increasing the optical frequency modulation, or chirp of the laser or by introducing additional signals to increase the chirp.

A primary disadvantage of increasing the transmitted optical spectrum to reduce interferometric noise is a corresponding increase in the amount of intermodulation distortion due to fiber dispersions. Also, the deliberate introduction of additional signals to increase the optical spectral width of the transmitted signal may intensify the distortion caused by clipping. Therefore, it would be advantageous to provide a method and apparatus for producing a chirp generating signal that does not increase the distortion caused by clipping, as well as a method and apparatus for reducing clipping that does not require significant delay of the main RF signal.

SUMMARY OF THE INVENTION

There is therefore provided according to a presently preferred embodiment of the present invention, a method and apparatus for reducing clipping distortion and interferometric noise that do not require significant delay of the main RF signal. In a preferred embodiment of the present invention, an information carrying signal with high amplitude peaks drives the RF input of a laser as well as the input of a laser bias control circuit. The output of the laser bias control circuit is coupled to the bias input of the laser. The laser bias control circuit directly modulates the laser with a low frequency signal that is proportional to the frequency of occurrence and intensity of peaks in the information carrying signal that are likely to cause the laser to clip.

Alternatively, the laser bias adjustment circuit is also applied to a voltage variable RF attenuator. The voltage variable attenuator serves to substantially cancel or reduce amplitude modulations of the RF carriers due to the modulation of the laser bias current.

These and other aspects of the present invention will be more readily understood when considered in connection with the drawings and the following detailed description.

DETAILED DESCRIPTION OF THE INVENTION

In a preferred embodiment of the present invention a clipping suppression circuit is employed to substantially reduce or eliminate the interferometric noise and clipping distortion exhibited in optical transmission systems when launching a multi-channel signal.

Figure 1:
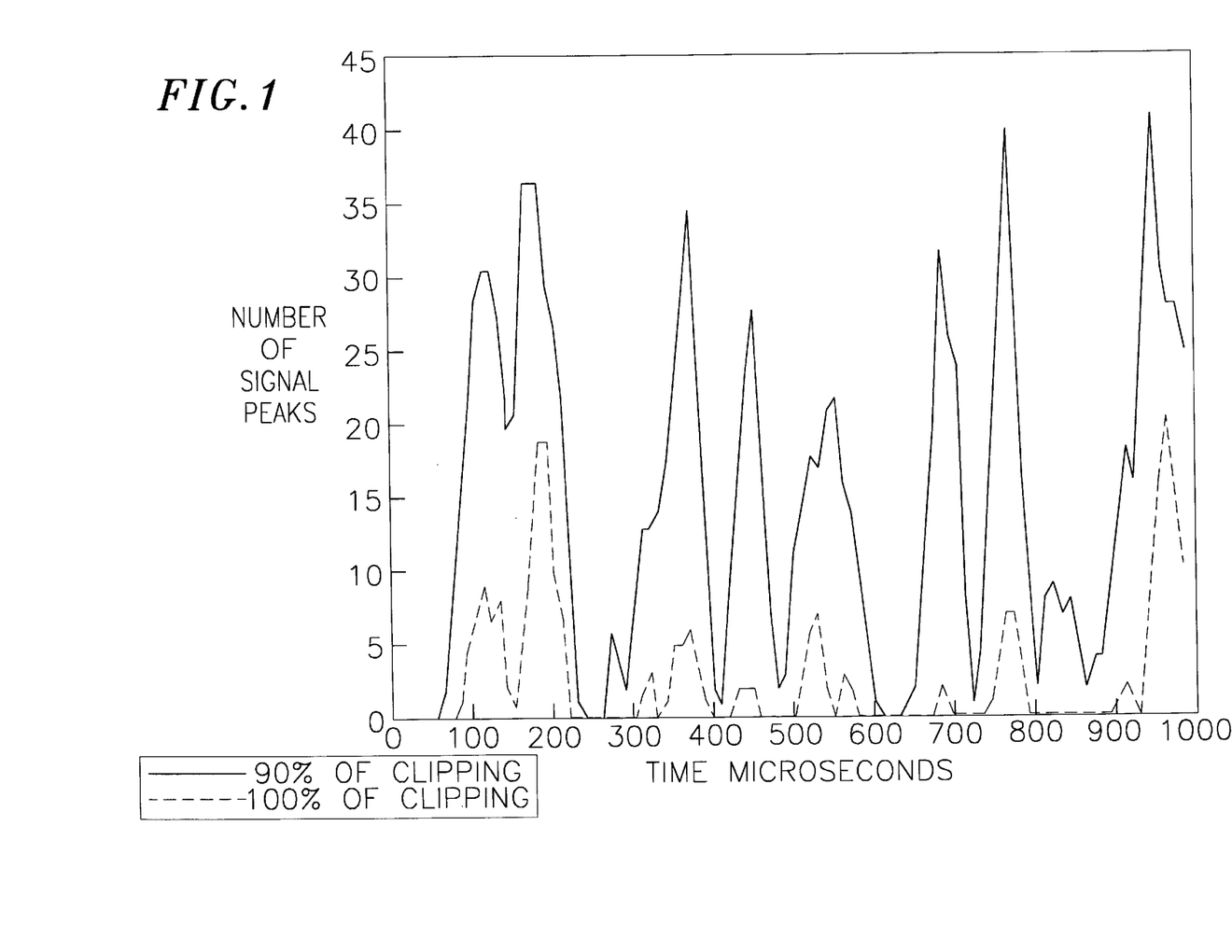
FIG. 1, is a graphical representation of a typical 110 channel NTSC signal over time, showing the predicted number of peaks in the signal at 90% and 100% of the amplitude that would potentially cause clipping for a 2 millisecond period.

FIG. 1 shows a graphical representation of an exemplary 110 channel NTSC signal over a one millisecond period. The graph illustrates a number of amplitude peaks in the 110 channel signal at 90% and 100% of the amplitude that may cause clipping. As shown in the graph clipping events in the transmission of a multi-channel signal are typically not random, but instead generally occur in clusters or bursts. The non-random occurrence of clipping events may be used to anticipate when a clipping event is more or less likely to occur. A preferred embodiment of the clipping suppression circuit detects amplitude peaks in the information carrying signal that are likely to cause the laser to clip. Because of the non-random nature of clipping events, it is then more likely that a cluster of additional clipping events will follow. The clipping suppression circuit raises the laser bias in response to the increased probability that a clipping event will occur. Likewise, the clipping suppression circuit lowers the laser bias when a clipping event is less likely to occur.

The duration of the cluster generally depends on the extent to which the channels deviate in frequency from their nominal values. If each channel of an NTSC signal was transmitted precisely at the nominal frequency for that channel, for example, the signal would be periodic with a 4 microsecond period. That is, every 4 microseconds, the channels would have the same relative phase.

However, frequency deviations of several kilohertz are typical for networks transmitting multi-channel signals, so that the actual relative phase of each channel slowly varies with time. Occasionally, the relative phase of the individual channels is such that an enhanced probability of large signal peaks is created. The result, as shown in FIG. 1, is a cluster of clipping events. This cluster of clipping events typically continues until the relative phase of the individual channels drifts from the alignment condition that led to clipping. The duration of the cluster is generally inversely proportional to the magnitude of the frequency errors. Typical frequency errors for a 110 channel NTSC channel, for example, are in the range of about 10 kHz, with a corresponding cluster duration of about 100 $\mu$sec. Therefore, when the preferred circuit embodiment detects a clipping event, there is an increased probability that additional clipping events will occur in the next 100 $\mu$sec of data transmission, so that the laser bias can be adjusted accordingly.

Figure 2:
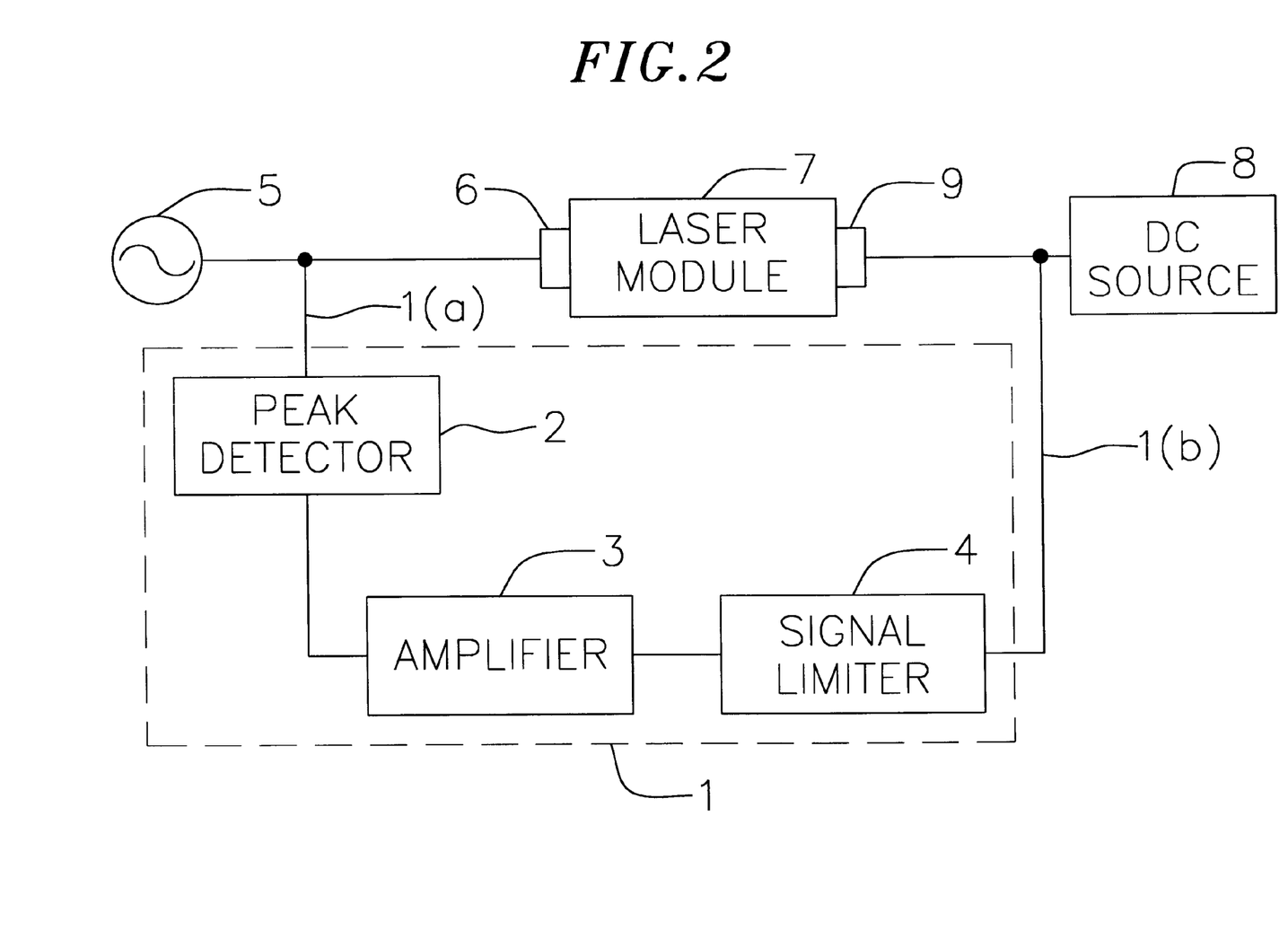
FIG. 2 is a system block diagram of an optical transmission system that includes a laser bias adjustment circuit for controlling the laser bias so as to suppress clipping distortion and interferometric noise.

FIG. 2 is a system block diagram of a preferred circuit embodiment for controlling laser bias so as to reduce or eliminate clipping and interferometric noise. The circuit 1 preferably includes a peak detector 2, an amplifier 3, and a signal limiter 4. For this embodiment, it is assumed that the cathode of the laser diode is grounded. Therefore, the laser is energized by applying a positive signal to the laser. However, it is to be understood that lasers can also be packaged with the anode grounded, in which case a negative signal is applied to the module to energize the laser. The laser bias adjustment circuit 1 is applicable to anode grounded packages, but with the polarity of the signals inverted.

An information carrying signal 5 is conventionally coupled to a RF input port 6 of a laser 7 as well as an input 1($a$) to the laser bias adjustment circuit 1. An output 1($b$) of the laser bias adjustment circuit 1 is combined with a constant DC source 8 to drive bias input 9 of laser 7. The peak detector 2 produces an output signal that is proportional to the frequency of occurrence and intensity of peaks in the information carrying signal that are likely to cause the laser 7 to clip, i.e. clipping events.

The output of peak detector 2 is coupled to the input of the amplifier 3, which adjusts the amplitude of the peak detector 2 to a level suitable for varying the bias of the laser 7. The output of the amplifier 3 is preferably AC coupled so as not to alter the DC optical power level of the laser 7.

Figure 4:
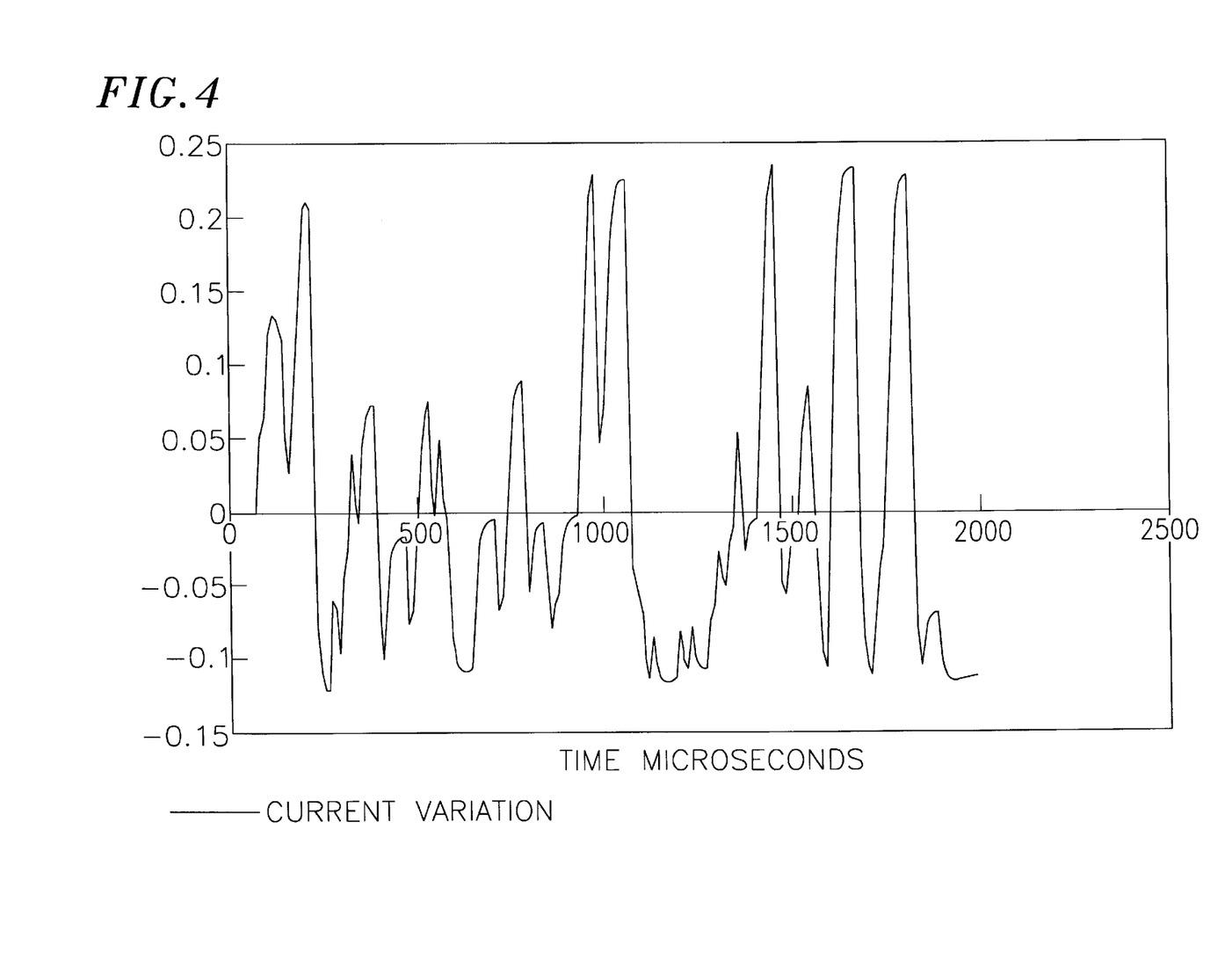
FIG. 4 is a typical AC coupled waveform within the laser bias control circuit that is positive when the amplitude of an information carrying signal is sufficient to cause clipping, and negative otherwise.

FIG. 4 shows a typical waveform for the AC coupled signal at the output of the amplifier 3. This signal is positive when the amplitude of the information carrying signal 5 is sufficient to cause clipping, and negative otherwise. In the frequency domain, the AC coupled signal at the output of the amplifier 3 is noise-like, encompassing a frequency range from near DC to a frequency of about 10 kHz. One feature of the signal is that the waveform will occasionally have very large positive peaks during particularly large clipping clusters. Through a series of simple experimental measurements, it has been found that these positive peaks can sometimes be much larger than the bias voltage required to suppress clipping.

There are some possible disadvantages of excessively large positive variations of the amplitude of the laser bias signal. First, since the DC source 8 is not changed, any increase in the laser bias during one period should be offset by a decrease in laser bias during another period. This may result in the onset of clipping during periods that previously did not have any clipping events. Second, a large increase in laser bias can take the laser 7 out of the range where the laser has a linear transfer characteristic. This may result in increased laser distortion. Another possible disadvantage of large positive increases in laser bias is that there may be undesirable levels of intermodulation distortion between the main information carrying signals 5 and the signal that is varying the bias to the laser.

To counter the negative effects of excessive laser bias levels, a preferred embodiment of the present invention couples the output of amplifier 3 to the input of the signal limiter 4. The signal limiter 4 limits the maximum positive and, if required, negative signal amplitudes to preset levels. The final waveform generated by the laser bias adjustment circuit 1 is similar to that shown in FIG. 4. The signal is positive when clipping clusters are present in the information bearing signal and negative when clipping clusters are not present in the information signal. The net effect is preferably that there is more reduction of clipping distortion when the signal is positive than there is an increase in clipping distortion when the signal is negative.

Figure 3:
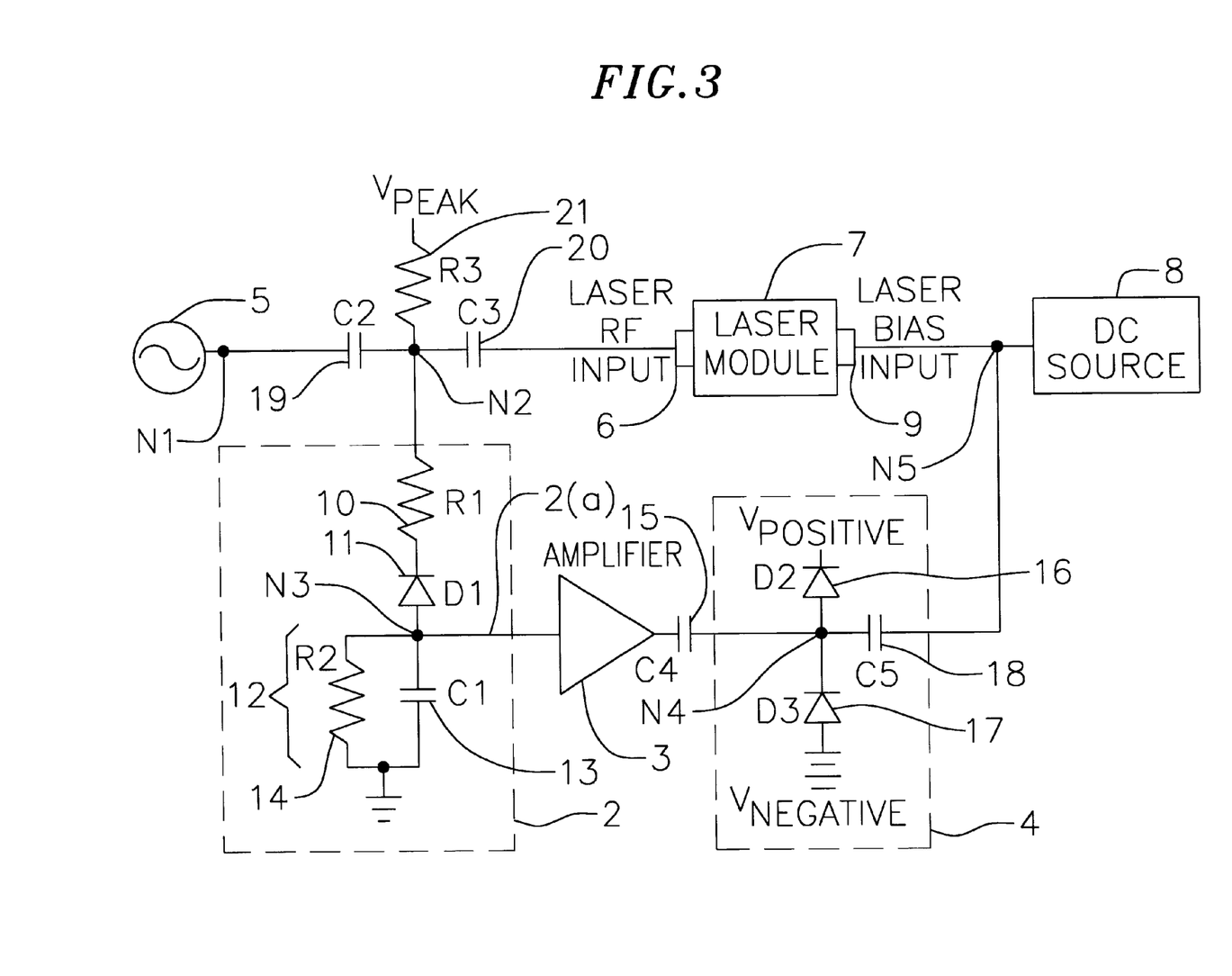
FIG. 3 is a schematic diagram of the optical transmission system including the laser bias adjustment circuit that directly modulates a laser with a low frequency signal that is preferably proportional to the frequency of occurrence and intensity of peaks in the information carrying signal that are likely to cause the laser to clip

A schematic diagram of the laser bias adjustment circuit 1 is shown in FIG. 3. The information carrying signal 5 drives a first node n1. A series capacitor 19 is connected between node n1 and a second node n2. The series capacitor 19 acts as a DC block on the input line. A capacitor 20 is connected between node n2 and the RF input port 6 of the laser 7. The peak detector 2 is located between node n2 and ground. The peak detector 2 preferably consists of an isolation resistor 10, in series with a reverse biased diode 11 between node n2 and a third node n3 and a parallel RC network 12 (a resistor 14 and a capacitor 13) connected between node n3 and ground. The parallel RC network 12 averages the signals from the diode 11. Due to the reverse bias on the diode 11, the diode 11 will only conduct current when there is a large negative peak in the multichannel information carrying signal 5 that exceeds the reverse bias voltage. In the preferred embodiment, the reverse bias voltage is set to a level slightly less than the signal level that will cause clipping ($V_{PEAK}$). A resistor 21 is connected between node n2 and the diode bias voltage $V_{PEAK}$.

In operation, negative peaks in the information carrying signal 5 that exceed the bias voltage $V_{PEAK}$ of the diode 11 cause current to flow through the diode 11 discharging capacitor 13. The voltage on the capacitor 13 temporarily goes negative. In the absence of additional clipping events, charge will flow back to the capacitor 13 through the resistor 14. The voltage on the capacitor 13 will return to zero with a time constant equal to the product of the capacitor 13 and the resistor 14. The RC time constant should preferably be greater than the time between peaks in the information carrying signal that may cause clipping so that the laser bias remains high during these periods. However, the time constant should be small compared to the typical duration of a clipping burst. For a typical 110 channel NTSC signal with frequency errors in the range of about 8–12 kHz the RC time constant is preferably in the range of about 1–15 μsec.

If multiple peaks in the information carrying signal 5 occur, the RC network 12 produces a voltage at the capacitor 13 that is proportional to a moving average of the current flowing through the diode 11. The isolation resistor 10 is preferably used to prevent distortion generated by the peak detection circuit 2 from degrading the main information carrying signal 5.

The peak detection circuit 2 preferably generates a laser bias control signal 2(a) that is proportional to the frequency and intensity of the clipping events. As will be recognized by those skilled in the art, there are numerous other circuit configurations capable of achieving this same result. The input to the amplifier 3 is connected to node n3. The amplifier 3 adjusts the amplitude of the laser bias control signal to a level suitable for varying the bias of the laser 7.

The output of amplifier 3 is preferably AC coupled through a series capacitor 15 to the input of the signal limiter 4 at a fourth node n4. The signal limiter 4 is a diode limiter, wherein diodes 16 and 17 limit the maximum positive and, if desired, negative amplitudes of the laser bias control signal to preset levels. Forward biased diode 16 is connected between node n4 and diode bias voltage source $V_{positive}$. Reverse biased diode 17 is connected between node n4 and diode bias voltage source $V_{negative}$. The maximum preset level can be set by adjusting the bias voltages $V_{postive}$ and $V_{negative}$ of diodes 16 and 17 respectively. The signal limiter 4 is AC coupled through a series capacitor 18 to a fifth node n5. A constant optical power DC source 8 is connected to node n5. The bias input port 9 of laser 7 is also connected to node n5. Ideally, coupling capacitors 15 and 18 behave like open circuits to a direct current, so as to prevent alteration of the power level of the DC source 8.

The laser bias adjustment circuit 1 preferably has one or more advantages for systems that transmit low noise, low distortion multi-channel optical signals. One advantage is that laser 7 is modulated at a low frequency (<10 KHz) by the laser bias adjustment circuit 1. This low frequency modulation results in substantial broadening of the optical spectrum. The amount of spectral broadening per milliamp of current is much higher for signals in the kilohertz range than for the main multi-channel information carrying signal 5. This low frequency signal has the effect of thermally modulating the laser. That is, the operating temperature of the device varies, as does the transmitted wavelength, in accordance with the amplitude of the drive source. This low frequency thermal modulation contributes to the spectral broadening in the preferred embodiment of the present invention. Preferably, the spectral broadening substantially reduces the interferometric noise. In addition, unlike other low frequency modulation techniques, the laser bias adjustment circuit 1 preferably automatically aligns the dither signal in such a way as to also reduce clipping distortion.

Figure 5:
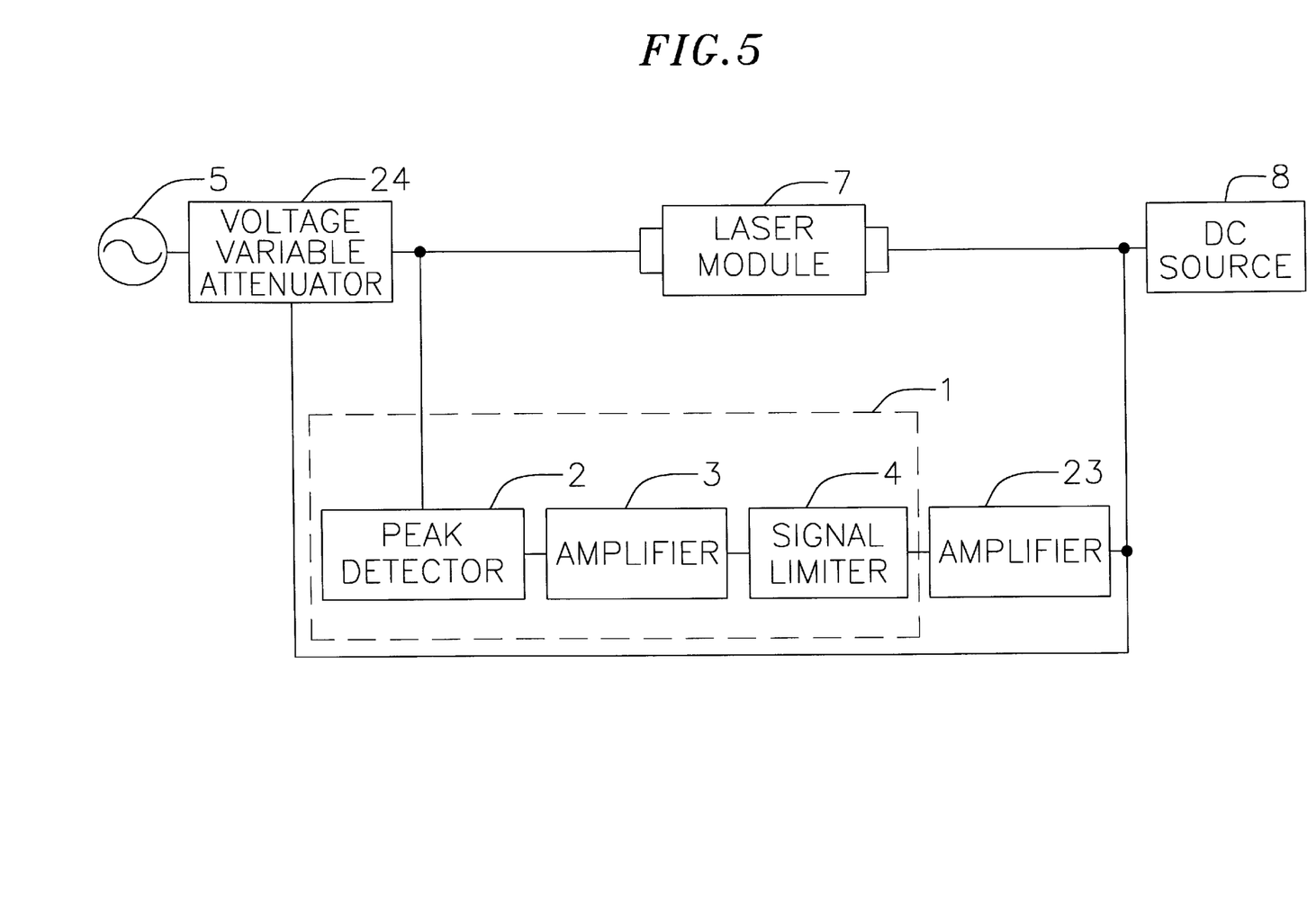
FIG. 5 is a schematic block diagram of an optical transmission system with an alternative laser bias adjustment circuit that includes a voltage variable attenuator to help control undesirable modulation of amplitude of the RF carriers.

The signal limiter 4 reduces potential distortion from the laser bias adjustment signal. However, it is experimentally observed that unwanted amplitude modulation of the RF carriers may occur. Therefore, in an alternative circuit embodiment, the output of the laser bias adjustment circuit is input to a second amplifier 23 which amplifies the laser bias adjustment signal to a level suitable for input to a voltage variable RF attenuator 24 as shown in the block diagram of FIG. 5. As will be appreciated by those of skill in the art, the amplification function served by amplifiers 3 and 23 may be performed by a single amplifier. The voltage variable RF attenuator 24 amplitude modulates the input RF carriers in a manner that is substantially equal in amplitude but opposite in sign to that produced by the modulation of the laser bias current.

Figure 6:
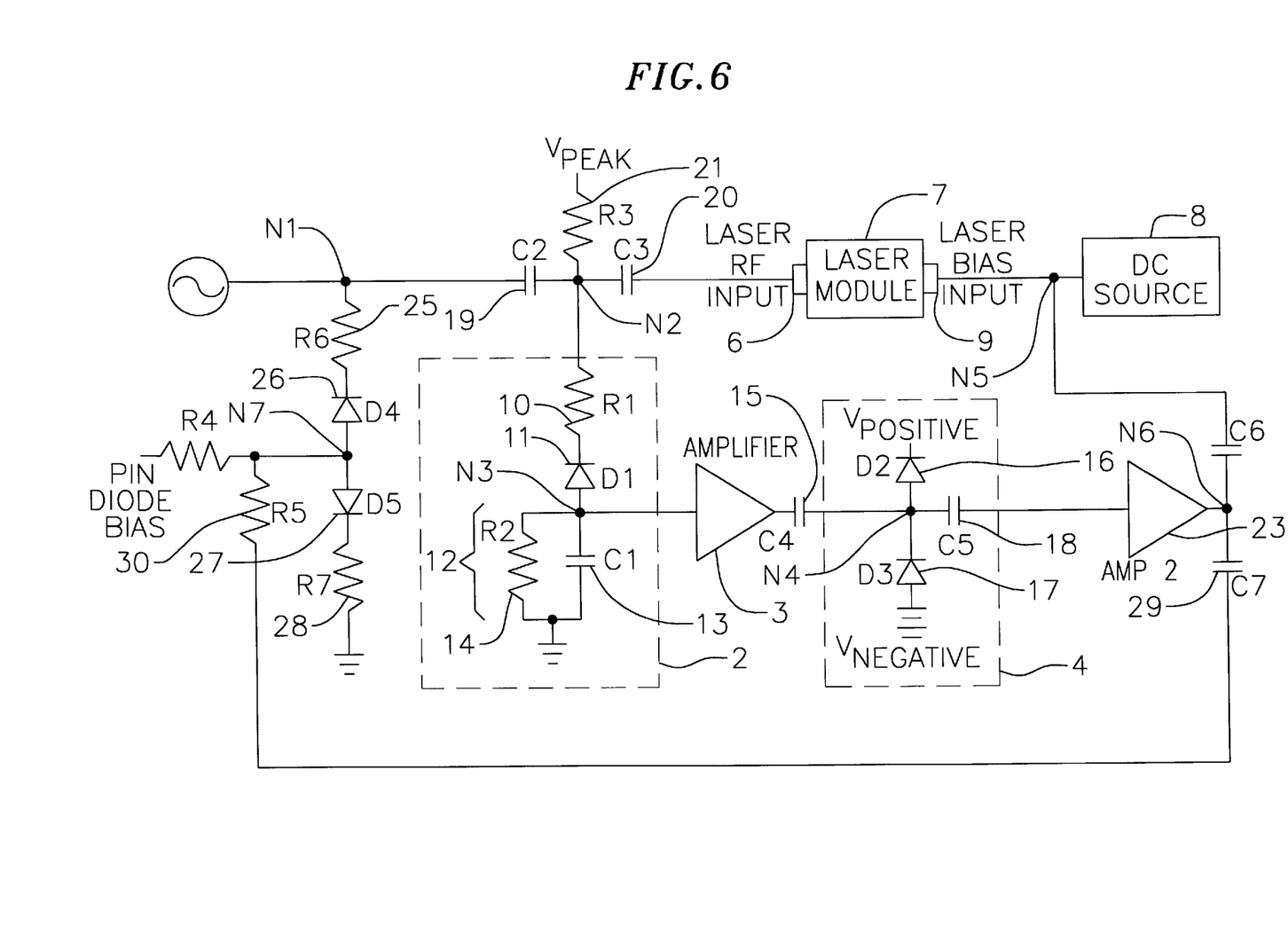
FIG. 6 is a schematic circuit diagram of the optical transmission system of FIG. 5, wherein the output voltage of the laser bias adjustment circuit is applied to the voltage variable attenuator that modulates the amplitude of the RF carriers.

A schematic circuit diagram of the alternative circuit embodiment is shown in FIG. 6. Again the information carrying signal 5 drives node n1. The voltage variable RF attenuator 24 is connected between node n1 and ground. The voltage variable RF attenuator 24 comprises an isolation resistor 25 in series with a diode 26, between node n1 and a seventh node n7. The cathode or negative terminal of diode 26 is connected to the resistor 25 and the anode or positive terminal of diode 26 is connected to the seventh node n7. In addition, the voltage variable RF attenuator 24 further includes a diode 27 connected in series with a resistor 28 between the seventh node n7 and ground. The anode or positive terminal of diode 27 is connected to the seventh node n7 and the cathode or negative terminal of diode 27 is connected to the resistor 28. The diodes 26 and 27 are preferably pin diodes. Current flow through the diodes 26 and 27 is dependent upon the diode bias voltage, so that the diodes 26 and 27 act as a variable resistor that shunts signals away from the main RF transmission path in accordance with the diode bias voltage.

Diodes 26 and 27 are biased by the output of the voltage bias adjustment circuit 1 at the seventh node n7 through a coupling capacitor 29 and a resistor 30. The bias voltage of the diodes 26 and 27 increases as the amplitude of the signal driving the laser bias input 9 is increased. This results in a lower equivalent resistance and greater current flowing through these devices. This produces amplitude modulation of the RF carriers that is equal in amplitude but opposite in sign to that produced by the modulation of the laser bias current. As will be appreciated by one of ordinary skill in the art, a single diode or other variable resistance shunt devices could be used in lieu of diodes 26 and 27.

Although a preferred embodiment of the present invention has been described, it should not be construed to limit the scope of the appended claims. Those skilled in the art will understand that various modifications may be made to the described embodiment and that numerous other circuit configurations are capable of achieving this same result. Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention.

What is claimed is:

1. An optical transmission system for transmitting information with reduced interferometric noise and clipping distortion in linear fiber optic links comprising:
   a laser having an RF input for receiving an information carrying signal, wherein the information carrying signal includes amplitude peaks that cause the laser to clip; and
   a laser bias control circuit that monitors said information carrying signal to detect a first amplitude peak in said information carrying signal that causes said laser to clip and adjusts laser bias current to prevent subsequent amplitude peaks within a predetermined period in said information carrying signal from causing said laser to clip as a function of the detection of said first peak.

2. The optical transmission system of claim 1 wherein the laser bias control circuit further comprises:
   a peak detector which generates a laser bias control signal that is proportional to frequency of occurrence and intensity of the amplitude peaks in the information carrying signal that would cause said laser to clip.

3. An optical transmission system for transmitting information with reduced interferometric noise and clipping distortion in linear fiber optic links comprising:
   a laser having an RF input for receiving an information carrying signal, wherein the information carrying signal includes amplitude peaks that cause the laser to clip;
   a laser bias control circuit that detects a first amplitude peak in said information carrying signal that causes said laser to clip and adjusts laser bias current prior to occurrence of a second amplitude peak in said information carrying signal that would cause said laser to clip as a function of the detection of said first peak; and
   wherein said laser bias control circuit comprises a peak detector which generates a laser bias control signal that is proportional to frequency of occurrence and intensity of the amplitude peaks in the information carrying signal that cause said laser to clip;
   and wherein said peak detector comprises a resistor connected in series with a shunt device and a parallel RC network, wherein the shunt device conducts current when there is a voltage peak in the information carrying signal that exceeds a preset voltage level.

4. The optical transmission system of claim 3 where the shunt device is a reverse biased diode.

5. The optical transmission system of claim 4 wherein bias voltage level of the diode is below a voltage level of the information carrying signal that would cause the laser to clip.

6. The optical transmission system of claim 2 further comprising an amplifier which adjusts amplitude of the laser bias control signal to vary said laser bias current.

7. The optical transmission system of claim 2 further comprising a signal limiter which restricts maximum amplitude of the laser bias control signal to a preset level.

8. The optical transmission system of claim 6 wherein the amplifier is ac coupled with a series capacitor.

9. The optical transmission system of claim 7 wherein the signal limiter is a diode limiter.

10. An optical transmission system for transmitting information with reduced interferometric noise and clipping distortion in linear fiber optic links comprising:
    a laser having an RF input for receiving an information carrying signal, wherein the information carrying signal includes amplitude peaks that cause the laser to clip; and
    a laser bias control circuit that detects a first amplitude peak in said information carrying signal that causes said laser to clip and adjusts laser bias current prior to occurrence of a second amplitude peak in said information carrying signal that would cause said laser to clip as a function of the detection of said first peak;
    a diode signal limiter which restricts maximum amplitude of the laser bias control signal to a preset level, wherein said diode signal limiter further comprises,
        a forward biased diode with a positive bias voltage level for restricting maximum positive voltage levels output by the laser bias control circuit; and
        a reverse biased diode with a negative bias voltage level for restricting maximum negative voltage levels output by the laser bias control circuit.

11. An optical transmission system for transmitting information with reduced interferometric noise and clipping distortion in linear fiber optic links comprising:
    a laser having an RF input for receiving an information carrying signal, wherein the information carrying signal includes amplitude peaks that cause the laser to clip; and
    a laser bias control circuit that monitors said information carrying signal to detect a first amplitude peak in said information carrying signal that causes said laser to clip and adjusts laser bias current to prevent subsequent amplitude peaks within a predetermined period in said information carrying signal from causing said laser to clip as a function of the detection of said first peak; and
    wherein the laser bias control circuit amplitude modulates transmitted RF carriers.

12. The optical transmission system of claim 11 further comprising a voltage variable attenuator for modulating the amplitude of the RF carriers in a manner that is substantially equal in amplitude and opposite in sign to the modulation produced by the laser bias control circuit.

13. The optical transmission system of claim 12 wherein the voltage variable attenuator is a variable resistance shunt device.

14. The optical transmission system of claim 13 wherein resistance of the variable resistance shunt device is inversely dependent upon amplitude of the laser bias control signal.

15. The optical transmission system of claim 12 wherein the variable voltage attenuator further comprises:
    a pin diode wherein the laser bias control signal varies current flow through the pin diode.

16. A method of suppressing clipping distortion and interferometric noise in a linear fiber optic link comprising the steps of:
    inputting an information carrying RF signal with amplitude peaks into an RF input of a laser;
    monitoring said information carrying signal to detect a first peak in said information carrying signal that causes said laser to clip; and
    increasing laser bias as a function of the detection of said first peak to prevent subsequent peaks within a predetermined period in said information carrying RF signal from causing said laser to clip.

17. The method of claim 16 wherein the step of increasing the laser bias further comprises directly modulating the laser bias with a signal that is substantially proportional to the frequency of occurrence and intensity of amplitude peaks in the information carrying signal.

18. The method of claim 17 wherein the step of directly modulating the laser further comprises the steps of:
    detecting amplitude peaks in the information carrying signal that may cause clipping distortion.

19. The method of claim 18 wherein the step of directly modulating the laser further comprises the steps of:
    generating a laser bias control signal that is proportional to the frequency of occurrence and intensity of amplitude peaks in the information carrying signal.

20. The method of claim 19 wherein the step of directly modulating the laser further comprises the steps of:
    amplifying the laser bias control signal to a level which is suitable for varying the bias of the laser.

21. The method of claim 20 wherein the step of directly modulating the laser further comprises the steps of:
    restricting amplitude of the laser bias control signal to preset levels; and
    inputting the laser bias control signal into a bias port of the laser.

22. A method of suppressing clipping distortion and interferometric noise in a linear fiber optic link comprising the step of
    inputting an information carrying RF signal with amplitude peaks into an RF input of a laser;
    detecting first peak in information carrying signal that causes laser to clip;
    anticipating occurrence of a second peak in information carrying signal that would cause the laser to clip as a function of the detection of said first peak;
    increasing laser bias by directly modulating the laser bias with the signal that is substantially proportional to the frequency of occurrence and intensity of amplitude peaks in the information carrying signal prior to the occurrence of said second peak; and
    amplitude modulating RF carriers in the information carrying signal in a manner that is equal in amplitude and opposite in sign to the modulation of the laser bias.

23. An optical transmission system comprising:
    a laser bias control circuit that monitors a characteristic of an information carrying laser input signal prior to inputting said information carrying laser input signal into said laser and increases laser bias to prevent clipping of said information carrying laser input signal as a function of said characteristic, without delaying input of said information carrying signal into a laser.

24. The optical transmission system of claim 23 wherein the laser bias control circuit further comprises a peak detector that generates a laser bias control signal that is proportional to frequency of occurrence and intensity of amplitude peaks in the information carrying signal that would cause said laser to clip.

25. The optical transmission system of claim 24 wherein the peak detector further comprises a resistor connected in series with a shunt device and a parallel RC network, wherein the shunt device conducts current when there is a voltage peak in the information carrying signal that exceeds a preset voltage level.

26. The optical transmission system of claim 25 where the shunt device is a reverse biased diode.

27. The optical transmission system of claim 26 wherein bias voltage level of the diode is below a voltage level of the information carrying signal that would cause said laser to clip.

28. The optical transmission system of claim 24 further comprising an amplifier which adjusts amplitude of the laser bias control signal to vary the laser bias current.

29. The optical transmission system of claim 28 wherein the amplifier is ac coupled with a series capacitor.

30. The optical transmission system of claim 24 further comprising a signal limiter that restricts maximum amplitude of the laser bias control signal to a preset level.

31. The optical transmission system of claim 30 wherein the signal limiter is a diode limiter.

32. The optical transmission system of claim 31 wherein the diode limiter further comprises:
    a forward biased diode with a positive bias voltage level for restricting maximum positive voltage levels output by the laser bias control circuit; and
    a reverse biased diode with a negative bias voltage level for restricting maximum negative voltage levels output by the laser bias control circuit.

33. The optical transmission system of claim 23 wherein the laser bias control circuit amplitude modulates transmitted RF carriers.

34. The optical transmission system of claim 33 further comprising a voltage variable attenuator for modulating amplitude of the RF carriers in a manner that is substantially equal in amplitude and opposite in sign to modulation of RF carriers created by the laser bias control circuit.

35. The optical transmission system of claim 34 wherein the voltage variable attenuator is a variable resistance shunt device.

36. The optical transmission system of claim 35 wherein resistance of the variable resistance shunt device is inversely dependent upon amplitude of the laser bias control signal.

37. The optical transmission system of claim 34 wherein the variable voltage attenuator comprises a pin diode wherein the laser bias control signal varies current flow through the pin diode.

38. An optical transmission system comprising:
    a laser bias control circuit that increases laser bias to prevent clipping of an information carrying signal, wherein the laser bias control circuit amplitude modulates transmitted RF carriers;
    a voltage variable attenuator for modulating the amplitude of the RF carriers in a manner that is substantially equal in amplitude and opposite in sign to modulation of RF carriers created by the laser bias control circuit.

39. The optical transmission system of claim 38 wherein the voltage variable attenuator is a variable resistance shunt device.

40. The optical transmission system of claim 39 wherein resistance of the variable resistance shunt device is inversely dependent upon amplitude of the laser bias control signal.

41. The optical transmission system of claim 38 wherein the variable voltage attenuator comprises a pin diode wherein the laser bias control signal varies current flow through the pin diode.

42. An optical transmission system comprising:
   a laser bias control circuit that adjusts laser bias to prevent a laser from clipping an information carrying signal; and
   wherein said laser bias control circuit comprises a peak detector comprising a resistor connected in series with a shunt device and a parallel RC network, wherein the shunt device conducts current when there is a voltage peak in the information carrying signal that exceeds a preset voltage level.

43. The optical transmission system of claim 42 where the shunt device is a reverse biased diode.

44. The optical transmission system of claim 43 wherein bias voltage level of the diode is below a voltage level of the information carrying signal that would cause said laser to clip.

45. The optical transmission system of claim 42 further comprising an amplifier which adjusts amplitude of the laser bias control signal to vary the laser bias current.

46. The optical transmission system of claim 45 further comprising a signal limiter that restricts maximum amplitude of the laser bias control signal to a preset level.

* * * * *